Feb. 25, 1969  A. TEUFEL  3,429,626
BEARING FOR A STRUCTURAL ELEMENT ROTATING ABOUT
A SHAFT AND ENGAGEABLE THEREWITH
Filed Nov. 1, 1966

Inventor:
ANTON TEUFEL
BY
Hammond and Littell
ATTORNEYS

United States Patent Office 3,429,626
Patented Feb. 25, 1969

3,429,626
BEARING FOR A STRUCTURAL ELEMENT ROTATING ABOUT A SHAFT AND ENGAGEABLE THEREWITH
Anton Teufel, Tubingen, Germany, assignor to Industriewerk Schaeffler OHG, Herzogenaurach, Germany, a corporation of Germany
Filed Nov. 1, 1966, Ser. No. 591,171
Claims priority, application Germany, Nov. 24, 1965, J 29,442
U.S. Cl. 308—217  2 Claims
Int. Cl. F16c *19/20, 33/46, 33/38*

ABSTRACT OF THE DISCLOSURE

A bearing for a structural element rotating about a shaft and engageable therewith for the transfer of torques or angular moments by rollers accommodated in pockets of a cage.

Prior art

In modern gear-shifts, particularly those used in automobile construction, the gears effecting the individual transmission steps are in continuous engagement. Depending upon the transmission step chosen, the gears corresponding with this step are brought into engagement with the respective shaft by means of couplings correlated with these gears. In this arrangement, two different phases of motion can result for the gear and the shaft. If the gear and the shaft are not engaged with one another, the gear executes a relative rotation in opposition to the shaft, and no rotation moment is transmitted. The rollers disposed between the gear and the shaft move in known manner with nearly half of the differential rate of revolutions between the outer and inner raceway which, for example, are formed by the bore in the gear and by the shaft surface, respectively. In the other possible phase of motion, the gear and the shaft are in engagement with one another to effect the transfer of angular moments or torques. In contrast with the first phase of motion, no relative movement of the gear with respect to the shaft occurs here. Instead, both execute a uniform rotation. During the transfer of the torque from one gear to another, a radially directed force component is created due to the gear engagement, which force acts on the shaft through the rollers.

The latter phase of motion can also be described as a state wherein the gear and the shaft both are at stand-still while the force rotates. The force transfer from the gear to the shaft occurs across several rollers due to the diametrical clearance present in each bearing. The extremely small transfer area which is formed by the rollers and the raceway creates even at a light force an exceptionally high surface pressure since the contact point for each roller is formed more or less only by a line, which pressure can lead to groove-like impressions. In turn, these impressions can bring about the destruction of the bearing raceway, particularly since the rollers having a shaft-connected gear do not alter their respective position in relation to the raceways during the entire time of this contact. It is known that because of the free motion which is more or less present in every roller bearing, the shaft will assume an eccentric position with regard to the bore of the gear or the structural component. Therefore, only a few rollers are fixed as it were between the outer and inner raceway. When the angular moment or torque rotates, the shaft itself executes a rotation with respect to the bore about the bore center. Because of this motion of the shaft, the rollers which are securely fixed between the two raceways undergo an exceptionally slight movement. Recently, attempts have been made to transmit this extremely slight movement of a roller which periodically comes into the fixed position to the other, unsecured rollers with the aid of the cage to effect a rotation of the entire bearing in this manner. However, each roller is accommodated with free motion, measured in peripheral direction, in the cage pockets. As a rule, this free motion is greater than the occurring advance motion of any individual roller. Therefore, this forward motion of a roller cannot be transmitted to the other rollers through the cage and the desired rotation of the entire bearing is not attained.

Objects of the invention

It is an object of the invention to provide a bearing for a structural element rotating about a shaft and engageable therewith in which the advancing motion of a single roller in its cage pocket will rotate the bearing unit.

This and other objects and advantages of the invention will become obvious from the following detailed description.

The invention

The bearing of the invention for a structural element rotating about a shaft and engageable therewith for the transfer of torques by means of rollers accommodated in the pockets of a cage comprises a cage with rollers accommodated in pockets, at least one of the axis-parallel walls of at least one of the pockets is inclined parallel to the direction going radially through the pocket center.

In a preferred bearing form of the invention, the two axis-parallel pocket walls of one or more pockets are arranged parallel to one another and the plane, passing through the pocket center and parallel to the pocket walls, extends to a distance from the cage axis.

Referring now to the drawings.

Figure 1:
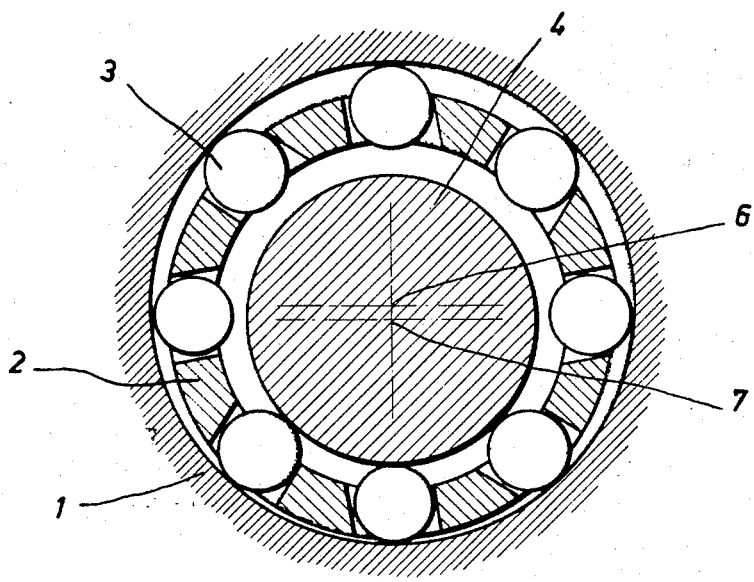
FIG. 1 is a cross-sectional view of the bearing of the invention mounted between a structural element and a shaft.

In FIG. 1, the structural element which can be a gear, for example, is indicated as 1 which in the disengaged position can rotate by means of rollers 3 disposed in cage 2 about a shaft 4. The arrow 5 indicates the direction of a force, which originates, for example, from the transfer of torques of another structural unit to the structural element 1. When the said element 1 and shaft 4 are in engagement with one another for the torque transfer, the force 5 can be conceived of as rotating about the center as described above. Because of the bearing clearance, the center 7 of the shaft 4 does not coincide with the center 6 of the structural element 1. The structural element 1 executes a movement about the center 7 due to the torque, during which movement the individually fixed rollers undergo a slight forward movement.

Figure 2:
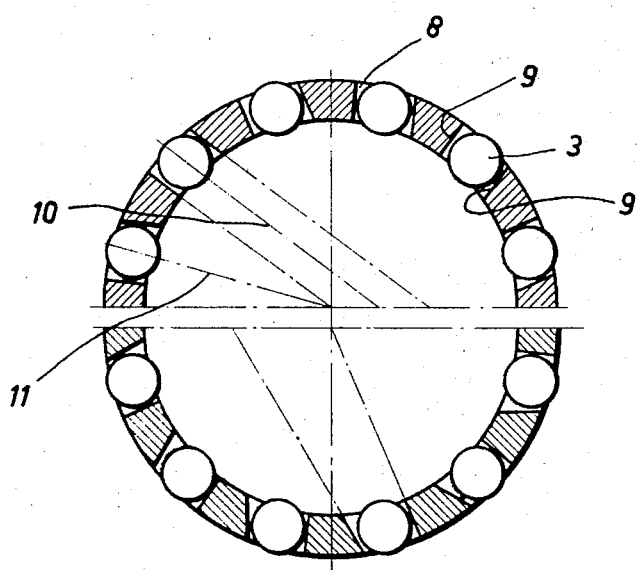
FIG. 2 is a cross-sectional view of a bearing of the invention.

FIG. 2 illustrates the cage 2 in enlarged scale and the rollers 3 are accommodated in pockets 8. In the upper half of FIG. 2, the two axis-parallel pocket walls 9 are in parallel relation to one another. The plane 10, parallel to these pocket walls and passing through the pocket center, extends to a distance from the cage axis. Due to this arrangement, the axis-parallel pocket walls 9 are inclined at a certain angle in relation to the radial plane 11, which also passes through the pocket center. In the lower half of FIG. 2, one of the two axis-parallel pocket walls runs in a radial direction while the other pocket wall is inclined at an angle oppositely to the radial direction.

Because the cage has free motion in relation to the cage bore and the shaft, the cage itself assumes an eccentric position in relation to the bore and the shaft. However, since the entire system actually rotates about the center 7, a centrifugal force develops which forces the rollers outwardly against the outer raceway. Because of this eccentric position of the cage, the rollers move in a relative motion with respect to the cage during a rotation of the force 5 if element 1 and shaft 4 are regarded as being at a standstill and the force 5 is regarded as rotating. When the rollers leave the area wherein they are disposed between the inner raceway and outer raceway, they advance relatively outwardly from the cage and abut against one of the inclined pocket walls 9 which results in the cage receiving an impulse in a peripheral direction. This impulse causes the cage to abut by means of an axis-parallel pocket wall against a roller. However as explained previously, this roller executes a slight forward motion in a peripheral direction which motion can be transmitted to the cage since it now abuts by means of one pocket wall against this roller.

Depending upon the pocket wall by means of which the cage abuts against the one roller, the impulse effected on the cage by the rollers advancing outwardly in relation to the cage can be directed in parallel direction of the forward movement to a roller in fixed position or it can be directed in the opposite direction. This depends upon the direction in which the axis-parallel pocket walls are inclined. By means of this impulse resulting from the rollers advancing outwardly in a direction relative to the cage, it is only necessary that the cage abuts with one pocket wall against the roller being in a fixed position at that time. It is immaterial which of the axis-parallel pocket walls abuts against the presently fixed rollers at a certain rotation direction.

By the bearing of the invention, the advance movement of the fixed rollers is utilized to force a rotation of the cage and thus of the entire roller system whereby the rollers change their position in relation to the inner and outer raceway. The raceways are no longer subjected to pressure at the same point, so that impressions on the raceways are prevented.

I claim:
1. A bearing for rotatably mounting a structural element on a shaft, said element being engageable with said shaft for the transfer of torques, comprising a cage provided with pockets and a plurality of rollers accommodated in said pockets, the pockets having two walls parallel to the cage-axis, at least one of the said axis-parallel walls of at least one of the said pockets being inclined to a radial plane comprising the cage-axis and the pocket center; each inclined axis-parallel wall being inclined in the same direction to the said radial plane, the planes of the axis-parallel walls meet outside of the cage circumference and have different angles to the said radial plane.

2. A bearing for rotatably mounting a structural element on a shaft, said element being engageable with said shaft for the transfer of torques, comprising a cage provided with pockets and a plurality of rollers accommodated in said pockets, at least one pocket having two walls parallel to the cage axis and parallel to each other and being disposed so that a plane also parallel to the said parallel walls and passing through the pocket center extends to a distance from the cage axis.

References Cited
UNITED STATES PATENTS

| 592,053 | 10/1897 | Hunt | 308—217 |
|---|---|---|---|
| 3,199,935 | 8/1965 | Pitner | 308—217 |

FOREIGN PATENTS 200,923  8/1908  Germany.

CARROLL B. DORITY, Jr., *Primary Examiner.*

U.S. Cl. X.R.

308—201